United States Patent Office 3,088,981
Patented May 7, 1963

3,088,981
METHOD OF MAKING A GLYCOL FROM AN OCIMENE PEROXIDE
Joseph H. Stump, Jr., Pensacola, and Oliver G. Wilson, Gulf Breeze, Fla., assignors to Newport Industries Company, Pensacola, Fla., a corporation of Delaware
No Drawing. Filed Apr. 4, 1958, Ser. No. 726,352
5 Claims. (Cl. 260—635)

The present invention relates to improvements in the synthesis of certain long chain unsaturated aliphatic alcohols which are coming to be widely used in the perfume industry.

The invention has particular applicability to the production of alkyl substituted octenols which have heretofore been produced only in small yields by more elaborate syntheses such as the Grignard reaction.

In our new method, we employ a monomeric peroxide of allo-ocimene as the starting material and hydrogenate this peroxide under controlled conditions to produce a saturated glycol. This glycol is then dehydrated to produce an unsaturated alcohol.

The preparation of the monomeric peroxide of allo-ocimene has been described in our co-pending application, Serial No. 704,990, filed December 24, 1957, now abandoned, and entitled "Oxidation of Allo-Ocimene." This application is a continuation-in-part of the aforementioned application.

As described in our previous application, a monomeric peroxide can be produced by oxidizing allo-ocimene with an oxidizing agent at temperatures from about 5° C. to about 105° C. to produce a polymeric peroxide which may be readily depolymerized by heat at temperatures preferably within the range from 100 to 120° C.

An object of the present invention is to provide an improved method for the production of alkyl substituted unsaturated alcohols.

Still another object of the invention is to provide an overall method for the synthesis of unsaturated long chain alcohols from allo-ocimene as the starting material.

Still another object of the present invention is to provide an improved process for increasing the yield of the intermediate glycol product in the synthesis of higher alcohols from allo-ocimene.

The monomeric peroxide produced by the method of said co-pending application has the following structural formula:

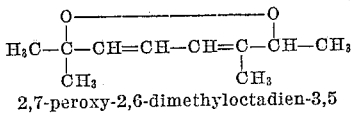

2,7-peroxy-2,6-dimethyloctadien-3,5

In accordance with this invention, the above identified product is reacted with hydrogen in the presence of a hydrogenation catalyst under conditions which may include a temperature from about 20 to 155° C. and a pressure ranging from about atmospheric (14.7 p.s.i.) to about 1,000 p.s.i. to produce a glycol having the following structural formula:

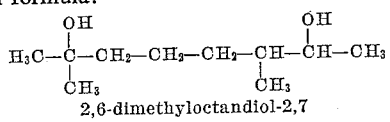

2,6-dimethyloctandiol-2,7

We have found that the yield of the glycol shown above can be substantially increased if the hydrogenation reaction is carried out in the presence of controlled amounts of water. Specifically, we have found that the inclusion of from about ½ to 7% of water, based upon the weight of the monomeric peroxide used, and preferably from about 2% to 4%, substantially increases the yield of the desired glycol above that which can be achieved in the absence of the added water.

The glycol is then dehydrated in the presence of a dehydrating agent such as Florida earth or other activated dehydrating clay, or fuller's earth, or an acid dehydrating agent, such as 1 to 10% phosphoric acid, 1 to 3% sulphuric acid, or other typical dehydrating agent. When earth-type reagents are used, the dehydration is accomplished by refluxing the glycol with the earth, usually with an inert solvent and with water removal at elevated temperatures on the order of 135 to 145° C. Earth concentrations of 8% by weight have proved to be satisfactory for dehydration.

When mineral acids are used, the most practical way to effect dehydration of the glycol is by steam distillation from the aqueous acid solution. This procedure permits the removal of the monohydric alcohol from the reaction zone as it is formed. Generally, the rate of steaming will be adjusted so that it contains the maximum concentration of alcohol predicted by the vapor pressure data. The recovered alcohol may then be refined by fractional distillation at reduced pressures, usually less than 20 millimeters of mercury absolute.

In the initial hydrogenation of the peroxide, a hydrogenation catalyst such as Raney nickel and other nickel catalysts have been found paraticularly useful. The normal concentration of such catalysts is about 0.5 to 3% by weight of the reaction mixture.

The glycol may be refined by filtering to remove the catalyst and then pot distilling the product at reduced pressures.

The following specific examples will illustrate more clearly the procedure involved in the synthesis of the higher alcohols.

Example I

A small flask was equipped with a magnetic stirrer, a side arm containing a surgical stopper and a gas inlet tube connected to a hydrogen cylinder. A one-gram sample of a Raney nickel was introduced into the flask along with approximately 30 ml. of toluene. The system was flushed with hydrogen and, over a period of two hours, fifteen ml. of the monomeric ocimene peroxide were introduced. The temperature slowly rose from room temperature to 50° C. during the course of the reaction and then returned to room temperature as the reaction neared completion. Stirring was continued for 22 hours. At the end of this time, the rate of hydrogen take-up was zero. The product was filtered and the toluene removed at reduced pressure to give 13 grams of the crude glycol having an index of refraction, $n_D^{20}$ 1.4580. The oil was distilled to give 7 grams of the glycol having a boiling range of 94 to 102° C. at 1.1 millimeters mercury pressure and having an index of refraction, $n_D^{20}$ 1.4591.

The yield obtained in this synthesis was 47% of the theoretical.

Example II

A 312 gram sample of refined ocimene peroxide was hydrogenated in a 1385 ml. rocking type autoclave in the presence of 6 grams of Raney nickel. The pressure ranged from 200 to 800 p.s.i. and the temperature was raised to 136° C. during the reaction. Hydrogen was added in increments to maintain the pressure above 200 p.s.i. The reaction was continued for four hours, after which the reactor was cooled to room temperature. The contents of the vessel were filtered to remove the catalyst and to recover 307 g. of oil.

The oil was distilled at reduced pressure in a Claisen still to recover 177 g. of glycol, $n_D^{20}$ 1.460, having a boiling range of 113 to 125° C. at 1.4 to 1.7 millimeters of mercury absolute pressure. The yield of glycol was about 55% of theoretical. Approximately 65 grams of the glycol were charged into a flask equipped with a reflux condenser, water trap, thermometer and heating mantle. Four grams of Florida earth were introduced and heat was applied. Enough benzene was added to maintain a temperature of 135 to 145° C. and the oil was refluxed for 1½ hours. 4½ ml. of water collected in the trap. The benzene was removed and the oil was distilled in a Claisen still at reduced pressure to give 39 grams of oil, $n_D^{20}$ 1.453, having a boiling range of 65 to 70° C. at one millimeter mercury absolute pressure, which analyzed 84% of the compound 3,7-dimethylocten-6-ol-2, having the following formula:

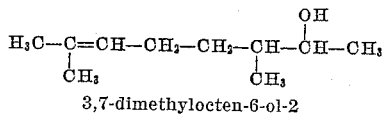

3,7-dimethylocten-6-ol-2

Example III

A 500 gram sample of refined ocimene peroxide together with 10 grams of Raney nickel and 18 grams of water were charged to the 1385 ml. rocking autoclave and hydrogenated as in Example II. The reaction required 7 hours. From the reaction mixture, we recovered 532 grams of oil, $n_D^{20}$ 1.4553, which was stripped of heads by Claisen distillation at 5 mm. Hg to leave 459 grams of glycol as a residue. The yield of glycol amounted to about 88% theoretical.

The glycol was dehydrated by steam distillation from 48 grams of 85% phosphoric acid in 1950 grams of water. From this dehydration, there were obtained 400 grams of crude dimethyloctenol, $n_D^{20}$ 1.4533, $$d\frac{15.5}{4}0.8687$$

and 4 grams of residue.

The crude dimethyloctenol analyzed 90% purity. The alcohol was recovered by fractional distillation at 10 mm. Hg pressure (absolute) in a column packed with protruded stainless steel packing. The product had the following constants: $n_D^{20}$ 1.456, $$d\frac{15.5}{4}0.860$$

and a boiling range of 101–102° C. at 10 mm. Hg absolute pressure.

Example IV

A 96 lb. sample of peroxide distillate was hydrogenated in the presence of 4 lbs. of water and 3 lbs. of Raney nickel in an agitator-type autoclave. The reaction was carried out by slowly elevating the temperature to 130° C. and maintaining a hydrogen pressure of 150–200 p.s.i. for 15 hours. After cooling to room temperature, there was recovered 104 lbs. of unfiltered oil, $n_D^{20}$ 1.4521.

This oil was filtered and worked up in small batches to produce refined glycol and alcohol.

A 1602 gram sample of the crude glycol was stripped of its heads oil by Claisen distillation at 5 mm. Hg (absolute) and to a head temperature of 112° C. The residue consisted of about 1150 grams of the glycol.

A 1070 gram sample of glycol from the Claisen distillation was steam distilled from 50 grams of $H_2SO_4$ in 1950 grams of water by passing steam into the mixture until no more oil distilled. The recovered dimethyloctenol weighed 897 grams, and 60 grams of a residue were produced. The distillate had the following constants: $n_D^{20}$ 1.4528, $$d\frac{15.5}{4}0.8691$$

The dimethyloctenol was refined by fractional distillation in a column packed with protruded stainless steel to produce a product having a purity in excess of 90%.

It will be evident that various modifications can be made to the described embodiments without departing from the scope of the present invention.

We claim as our invention:

1. The method of improving the yield of a glycol obtained by the hydrogenation of an ocimene peroxide, which comprises conducting said hydrogenation in the presence of a hydrogenation catalyst and an added amount of water constituting from ½ to 7% by weight of the peroxide present.

2. The method of improving the yield of a glycol obtained by the hydrogenation of an ocimene peroxide, which comprises conducting said hydrogenation in the presence of a hydrogenation catalyst and an added amount of water constituting from 2 to 4% weight of the peroxide present.

3. The method of improving the yield of a glycol obtained by the hydrogenation of an ocimene peroxide, which comprises conducting said hydrogenation in the presence of a hydrogenation catalyst and an added amount of water constituting from ½ to 7% by weight of the peroxide present, said hydrogenation being carried out at a temperature of from 20 to 155° C. and at a pressure ranging from atmospheric pressure to 1000 p.s.i.

4. The method of improving the yield of the compound 2,6-dimethyloctandiol-2,7 by hydrogenation of the compound 2,7-peroxy-2,6-dimethyloctadien-3,5 which comprises conducting said hydrogenation in the presence of a hydrogenation catalyst and an added amount of water constituting from one-half to 7% by weight of the peroxy compound present.

5. The method of claim 4 in which said hydrogenation is carried out at a temperature from 20 to 155° C. and at a pressure ranging from atmospheric pressure to 1000 p.s.i.

References Cited in the file of this patent

UNITED STATES PATENTS 2,454,936    Morey _____ Nov. 30, 1948

OTHER REFERENCES

Dranishnikov: Bull. Acad. Sci. (U.S.S.R.), Div. Chem. Sci., English Translation, May-June, 1953; pp. 421–8. Abstracted in Chem. Abs. 48, 9976 (1954).

Desalbres et al.: Bull. Soc. Chim. de France, Vol. 23, pp. 761–4 (1956).

Naves et al.: Bull. Soc. Chim. de France, Vol. 23, pp. 1768–73 (1956).